INVENTOR
EUGENI ESTREMS
BY William R. Barrett Jr.
ATTORNEY

Nov. 23, 1965 E. ESTREMS 3,219,981

PROGRAMMING DEVICE FOR DATA PROCESSING MACHINES

Filed June 26, 1961 8 Sheets-Sheet 2

PROGRAMMING DEVICE FOR DATA PROCESSING MACHINES

Filed June 26, 1961

8 Sheets-Sheet 6

Nov. 23, 1965 E. ESTREMS 3,219,981

PROGRAMMING DEVICE FOR DATA PROCESSING MACHINES

Filed June 26, 1961 8 Sheets-Sheet 7

United States Patent Office 3,219,981

Patented Nov. 23, 1965

3,219,981

PROGRAMMING DEVICE FOR DATA PROCESSING MACHINES

Eugeni Estrems, Saint-Mande, France, assignor to International Business Machines Corporation, New York, N.Y., a corporation of New York Filed June 26, 1961, Ser. No. 119,425
Claims priority, application France, July 5, 1960, 832,020, Patent 1,269,703
4 Claims. (Cl. 340—172.5)

This invention relates to data processing machines wherein the program is determined by means of a set of changeable electric connections, which establish sequences of operations with two or more addresses.

In known machines of this type, the program is a sequence of steps, generally called "instructions." To each instruction, there is assigned a memory element or a combination of memory elements set to a given state during the execution of said instruction. These memory elements are coupled, by means of connections changeable by the operator, to circuits determining the opoperation to be performed, i.e. the addresses of the memory areas assigned to the recording of the data and of the results, and possibly the type of operation. When the operation is completed, a signal characterizing the end of the operation controls the change to another preselected instruction by means of an instruction counter or an electric connection.

This system provides a great flexibility of operation, but requires a large number of variable connections, which result in complicating the work of the operator. This invention is directed toward reducing the number of these connections.

This reduction is obtained by eliminating the memory elements specially assigned to the instruction words, and by using, to determine the conditions of each operation to be performed the memory elements assigned to the storage of the address of one of the memory words used in the performance of that operation. The group of the thus used words or areas makes a storage which will be called in the succeeding description "work storage." In operating with this program, the various work storage words are scanned successively by a scanning ring or chain in an order changeable by the operator by means of special connections. The address defining circuits of each of these words (made of one or more elements of the scanning ring or by circuits connected to these elements permanently) are connected by removable connections (made of switches, or by plug wires connecting the hubs of a plug-board), to the circuits defining the address of the other words affected by the operation and to the circuits determining the type of operation to be performed.

The arrangement presents the following advantages:

(1) elimination of the memory elements necessary to the determination of the instructions (2) elimination of the scanning circuits of these memory elements (3) reduction of the number of variable connections.

Each of the areas of the work storage and of the other memories may comprise one or more locations, and in the latter case, the latter may be processed in parallel or serially, according to the special arrangement of the machine embodying the program device of the invention. In the case when the memory locations are processed serially, especially efficient results may be obtained by combining the program defining process described above with a process of dividing the memories into words of variable lengths. In this type of process, changeable connections may be made from circuits defining the addresses of all the locations of the work memory, to circuits defining the addresses of the locations of that memory or of the other memories which may be used by the data processing devices. To the ring scanning the work memory (which will be called hereafter "main ring") there will be associated auxiliary chains liable to scan said storage or the other storages, the number of chains being equal to the number of addresse used in that operation. To obtain a program, the circuits defining the address of the first location of each of the areas or words scanned by the main ring and used in an operation are connected to the circuits defining the address of the first location of each of the other areas; and to the circuits determining the type of operations to be performed. When the main chain reaches the first address of the word, it controls the transmission, through variable connections, of control signals which set the auxiliary chains to the state corresponding to the read-out and/or recording in the first address of each of the other words. These rings then scan the words to which they are assigned, synchronously with the scanning of the first word by the main ring.

This synchronous scanning does not necessarily comprise the simultaneous scanning of a memory location by each of the chains, the read and/or recording operations in the various areas being possibly shifted by a determined time interval, and the auxiliary chains being able, if the operation conditions require it, to perform stops, skips, returns, or parallel scannings of several locations.

When the main ring reaches the location following immediately the last location of the area, it controls the transmission, of signals controlling the end of the operation by variable connections connected to the address defining circuits associated to that location, and if necessary, the conditions of the following operation.

It is an object of the present invention to provide a data processing machine requiring fewer storage locations for instruction words.

It is another object of the present invention to provide a data processing machine in which instruction words contain only the address of a first operand.

A further object of the present invention is to provide programming apparatus for a data processing machine in which successive operands from a storage device select operations and any further needed operands for that operation.

Another and further object of the present invention is to provide a data processing machine wherein successive storage locations are selected and wherein the selection of a storage location in turn selects other locations for use with the data from the selected strage locations.

Still a further object of the present invention is to provide a data processing machine in which the operation of the machine and all data locations except one are determined by a single independent address register.

The foregoing and other objects, features and advantages of the invention will be apparent from the following more particular description of a preferred embodiment of the invention, as illustrated in the accompanying drawings.

Figure 6:
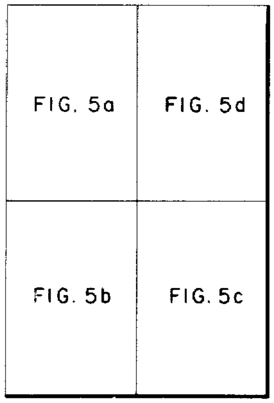

FIGS. 5*a* to 5*d* placed as indicated in FIG. 6 represent the main ring and the portion of the plugboard receiving signals from that ring.

FIG. 6 is a diagram of how FIGS. *5a* to *5d* are to be combined.

Figure 1:
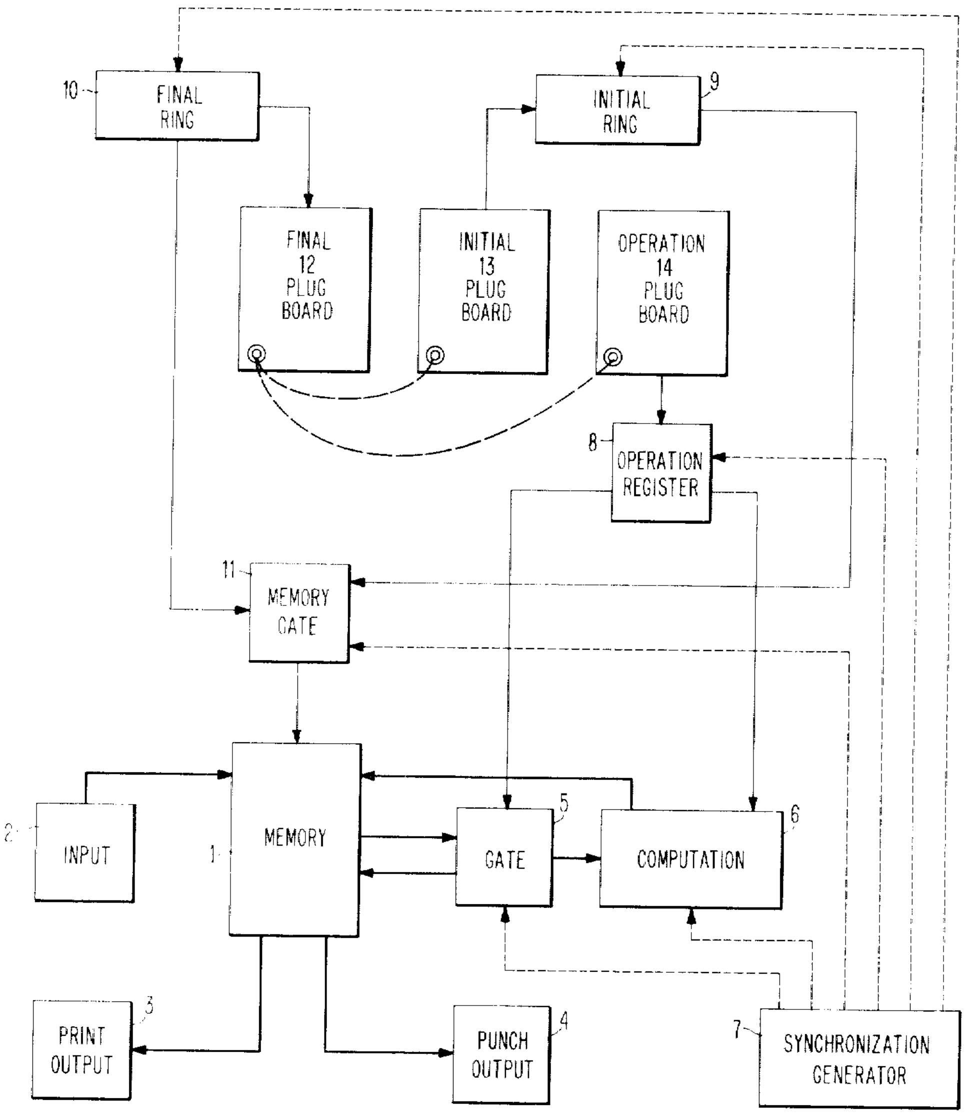
FIG. 1 is a schematic diagram of the data processing machine.

In FIG. 1 the data transfer circuits have been represented by full lines, the control circuits by thin lines and the general timing circuits by dotted lines.

The device comprises a memory unit 1, which may receive information from an input 2 (for example a punched card reading machine) and transmit information to an output circuits 3 and 4 (for example a printing and a punching machine). The information from memory 1 may be transferred between various locations of storage 1 through a gate 5 comprising temporary recording or buffer elements. This transfer may be performed with or without transformation by a computation element 6.

In the herein described device, the storage of information in memory unit 1 from input circuits 2 and the readout of information from memory unit 1 to output circuits 3 and 4 are performed through conventional means which are no part of the invention and will not be described. Only the transfers between unit 1 and elements 5 and 6 use the principles of the invention.

In the description below, it will be supposed that each operation affects two words: one which will be called "final" word, is intended to receive the result of the operation; it may, before the beginning of the operation, store one word of the data; the other word, which will be called "initial" word, contains, before the operation, the data or one of the data, which may or may not be preserved in said word after the operation. The "initial" word may on the other hand be identical to the "final' word. (It is well understood that the operations which will be described or mentioned will not necessarily be computations, but may be simple transfers. Each word comprises one or more memory locations each assigned to the recording of a character. Each location may be composed of several binary elements or bits, the combination of which defines the character recorded. It will be supposed that the various locations of each word are processed successively, but that the bits of one location are processed simultaneously (series-parallel system).

An operation therefore is composed of a sequence of basic operations affecting one location of the "initial" word and one location of the "final" word. The term "digit time" indicates the time necessary to the performance of a basic operation. In the course of a digt time, a digit or character is transferred from the "initial" word to gating element 5; another character, if needed, is transferred from the "final" word to the same gating element, and one of these characters, or a character resulting from the combination of the two characters by arithmetic element 6 or a transformation of one of the two characters by the arithmetic organ is transferred from gating element 5 to the "final" word (directly or through element 6). Though the invention is applicable to machines wherein these various transfers are practically simultaneous, it will be supposed in what follows that these transfers are successive and comprise temporary recordings in the special memory locations of gating element 5, which performs re-recordings in storage unit 1 such that the readout of an information from a memory location causes that information to be erased (as is the case in the conventional magnetic core memories). A digit time will then comprise the two following parts:

(1) "Initial" part composed of the following steps:

(a) restoration step, during which the buffer storage location in gating element 5 is reset (b) read-out step, during which a character may be transferred from one location of the "initial" word to the buffer storage of gating element 5.

(c) writing step, during which this character is re-recorded in the address of the "initial" word from which it has been read-out, if the gating organ is controlled to perform that re-recording; during that same step, the character is transmitted to a second temporary recording location in computation element 6 (that second location may be the adder of the computation organ, if that added is of the successive input type as that described in U.S. Patent No. 3,069,086, issued December 18, 1962, to Maurice Papo.

(2) "Final" part, composed of the following steps:

(a) restoration step, similar to phase (a) above, except when it is desired to transfer, without any modification, the data read during the preceding step.

(b) read-out step, during which a character may be transferred from one location of the "initial" word to the buffer storage location in gating element 5.

(c) operation and writing step, during which computation element 6 combines, if need be, the character recorded in the second buffer storage location (character from the "initial" word) with the character recorded in the first buffer storage location (character from the "final" word); the character resulting from that combination is then re-recorded in the location of the final area from which the second character has been extracted.

The various steps may be of an unequal duration. The passage from one step to the next one is controlled by synchronization signals supplied by a generator 7. The control signal controlling or preventing the recordings and re-recordings into storage unit 1 and determining the operative conditions of computation element 6 are supplied by an operation register 8. The selection of the position of memory 1 from which a character may be extracted and wherein it may be re-recorded during the initial part of the digit time, and the selection of the position from which a character may be extracted and wherein a character may be recorded during the final part of that digit time are determined by:

(1) a scanning chain or ring 9 provided to scan the "initial" words; it is made preferentially of a combination of basic rings formed of a succession of bistable elements, i.e. liable to assume two stable states, the ON state and the OFF state; one element only of each basic chain is ON at a time, and the combination of the elements ON defines a location in storage 1.

(2) a scanning ring 10 of a similar composition, provided to scan the "final" words.

(3) a read and recording control gate 11, which controls character extractions or recordings in the memory locations at times determined by generator 7 and defined by chain 9 (during the initial part of each digit time) or by chain 10 (during the final part of each digit time). If the storage elements of unit 1 are magnetic cores, 11 may be made of a combination pulse generators and electronic switches, the energization of a generator and the closure of a switch resulting in applying a pulse to a wire going through a number of cores. Logical circuits combine the timing signals from generator 7 and the signals from the bistable elements of rings 9 and 10 to energize the generators and close the switches, the combination of which defines the same location as the combination of the elements in the rings in the ON state.

The general organization of information transfers and processing which has just been disclosed is shown more particularly in U.S. Patent No. 3,132,324, issued May 5, 1964, application to E. Estrems now Patent No. 3,132,324.

Description will be made now of the characteristics of the device which are more particularly the object of the present invention; these characteristics concern the program control.

In accordance with the above indicated principles, this control is accomplished by the address defining circuits of one of the words. In the illustrative example, it will be supposed that this word is the "final" word; the work storage therefore is made of all the "final" words; ring 10 is the main ring mentioned in the description of the principles, and ring 9 is an auxiliary ring. The circuits of ring 10 control, through a plugboard, the circuits of ring 9 and those of operation register 8. For simplicity of the drawing, this plugboard has been split into three basic boards: "final" board 12, "initial" board 13 and operation board 14; removable connections join the hubs of board 12 to the hubs of boards 13 and 14.

Before giving the details concerning the construction of the elements contained in the program control (rings 9 and 10 and plugboards 12, 13, 14), memory unit 1 and read and recording control element 11 will be briefly described.

Figure 2:
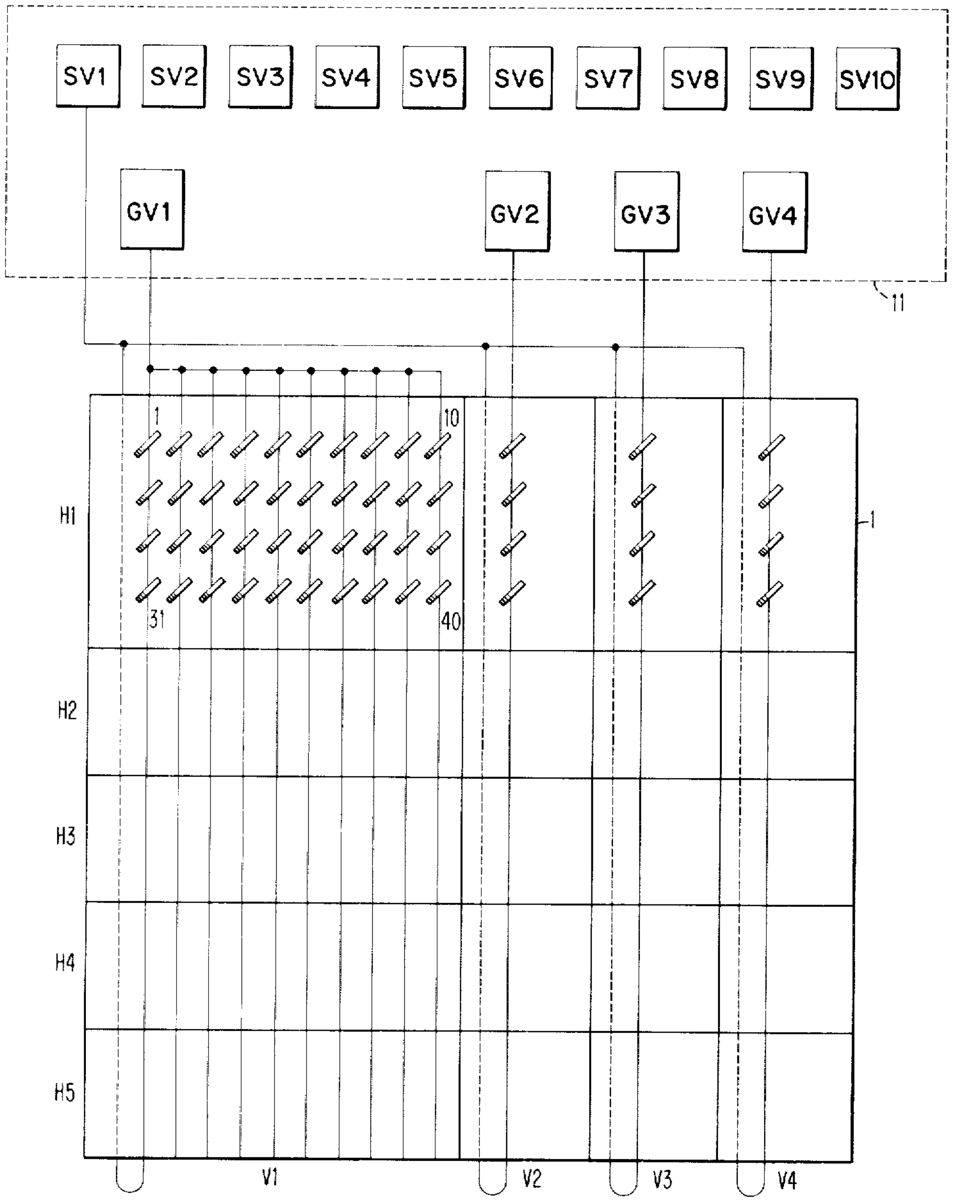
FIGS. 2 and 3 represent a memory unit which is part of the machine.

These elements are represented in FIG. 2. The bistable elements of memory 1 may record characters defined by 7 binary elements. Memory unit 1 is made of seven planes of superposed cores corresponding each to one of the bits and a character location is made of a set of seven cores each of which is contained in one of these planes. One single plane has been represented in FIG. 2. Each plane comprises 800 cores, arranged in 20 rows and 40 columns. These 800 cores form 20 groups of 40 cores by dividing each row into four parts $V_1$ to $V_4$, and each column into five parts $H_1$ to $H_5$ as indicated in the figure; each group therefore comprises four rows of ten cores. The figure shows all the cores of the $H_1V_1$ group and the first core column of groups $H_1V_2$, $H_1V_3$, and $H_1V_4$; in the other groups the cores have not been represented. In each group, the cores are numbered from 1 to 40 as indicated in the figure. In accordance with a known technique, each core is threaded by six wires: two column wires (one for reading and one for writing) common to all the cores of a same column and of all corresponding columns of all the planes; two row wires distributed similarly; and inhibiting wire, common to all the cores of a plane and used in the writing operation to select the binary elements of the character to be recorded; a detection wire common to all the cores of a plane and used, in reading operations, to collect, if needed, the pulse resulting from the switching of the core of the plane selected by the read pulses.

To each inhibiting wire, there corresponds an inhibiting pulse generator. To each column wire and to each row wire there is connected a read pulse generator or a writing pulse generator and an electronic switch. The passage of a pulse in the wire requires both the emission of a pulse by the generator and the closure of the switch. The generators and switches are arranged so that the combination of a generator and of a switch results in the selection of a row or a column.

In the device described, the generators are used for the selection of the groups, and the switches for the selection of the cores within the groups. The row switches correspond to the tens order of the number of the selected core and the column switches to the unit of that number. Therefore, there are:

(1) For the selection of a row, five pairs of pulse generators (composed of a read pulse generator and a recording pulse generator) and four switches.

(2) For the selection of a column, four pairs of pulse generators and 10 switches.

In the figure, there have only been represented read pulse generators $GV_1$ to $GV_4$ and switches $SV_1$ to $SV_{10}$ used in the selection of the columns. Besides, there have been represented all the column wires supplied by one of the generators and one of the column wires supplied by each of the others. The first one of the column wires supplied each by each of the generators is subjected to the action of switch $SV_1$; each of these wires passes through a column of all the core planes, and dotted lines represent the wires passing through planes other than that represented. Similarly, the second one of the column wires supplied by each generator is subjected to the action of switch $SV_2$ and so on. (Only the portion of the wires comprised in the plane of the figure has been represented).

The recording pulse generators (unshown) feed to lines wired in the same way; these wires reach to the same switches as the corresponding read pulse generators.

The rows are selected by means of read pulse generators, recording pulse generators, switches, and row wires. None of these elements has been represented, their arrangement being similar to that of the column selection elements.

To each generator and to each switch, there correspond an element or group of elements of ring 9 and one element or group of elements of ring 10, the first element or group being used for the selection of a generator or a switch during the "initial" portion of each digit time, and the second one during the "final" part. It is to be noted that the same ring elements select a read pulse generator and the recording pulse generator of the same pair. The connection between the ring elements and the generators or switches has not been represented and the operation of the circuits energizing the generators or closing the switches, from the ring elements and the timing circuits will be described. This control may be realized by means of known processes and in particular by those described in French Patent 1,165,259.

Figure 3:
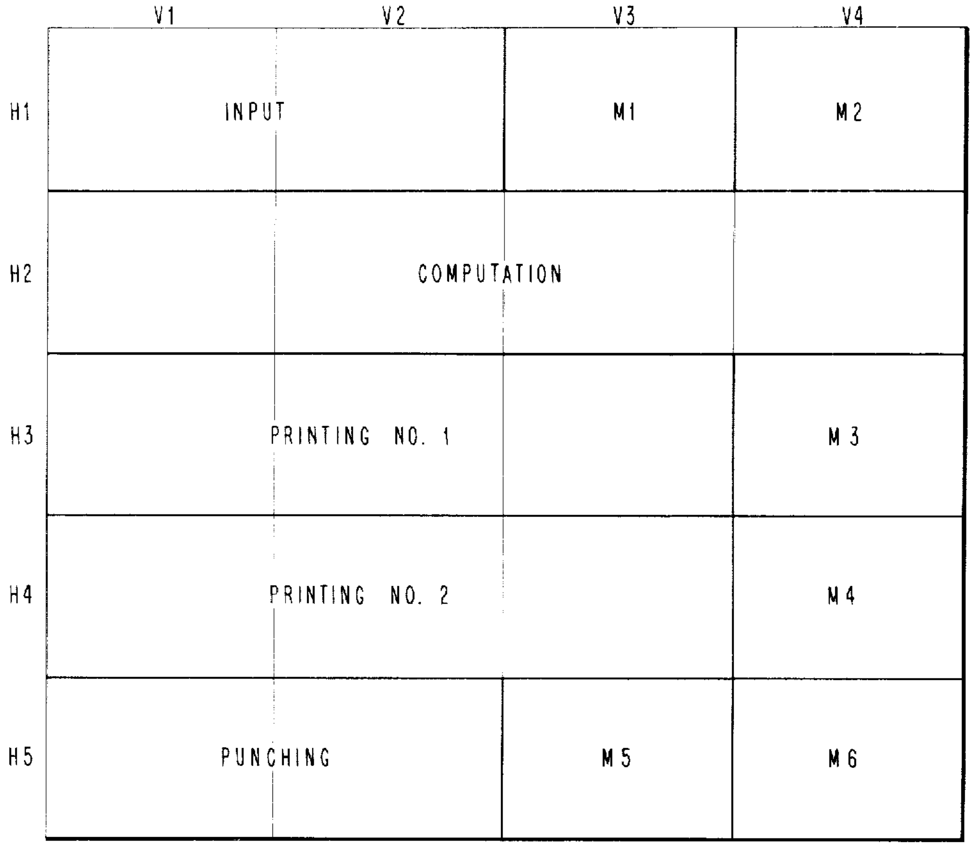

FIG. 3 represents the division of memory 1 into storage areas assigned each to a category of determined records. This division may be of any kind; a specific example has been selected in order to facilitate the understanding of the operation of the scanning by means of the rings. In the selected example, memory unit 1 comprises the following memories or storages:

(1) An input memory comprising groups $H_1$–$V_1$ and $H_1$–$V_2$, to receive the information from the input circuits (punched card reader, magnetic tape reader, etc.)

(2) A computation memory comprising groups $H_2$–$V_1$ to $H_2$–$V_4$ to receive the results of the operations (computations or transfers).

(3) Two printing preparation memories comprising repectively groups $H_3$–$V_1$ to $H_3$–$V_3$ and $H_4$–$V_1$ to $H_4$–$V_3$.

(4) A perforation preparation memory comprising groups $H_5$–$V_1$ and $H_5$–$V_2$.

(5) Six additional memories for one group, referenced $M_1$ to $M_6$.

During the initial part of each digit time, information may be extracted from the input memory, the computation memory or an additional memory. In the course of the "final" part of each "digit time" information may be recorded in the work storage, i.e. in the memory scanned by main ring 10. Each cycle of the machine is divided into steps, and in the course of each step, one of the memories of unit 1 is scanned by the ring. In the described example, the memories scanned by the main ring are the computation memory, the additional memories, a print preparation memory and the perforation preparation memory, some of these memories being, besides, scanned several times in the course of the cycle. The succession of the scannings will be explained with more details in the course of the description of the main ring.

Figure 4:
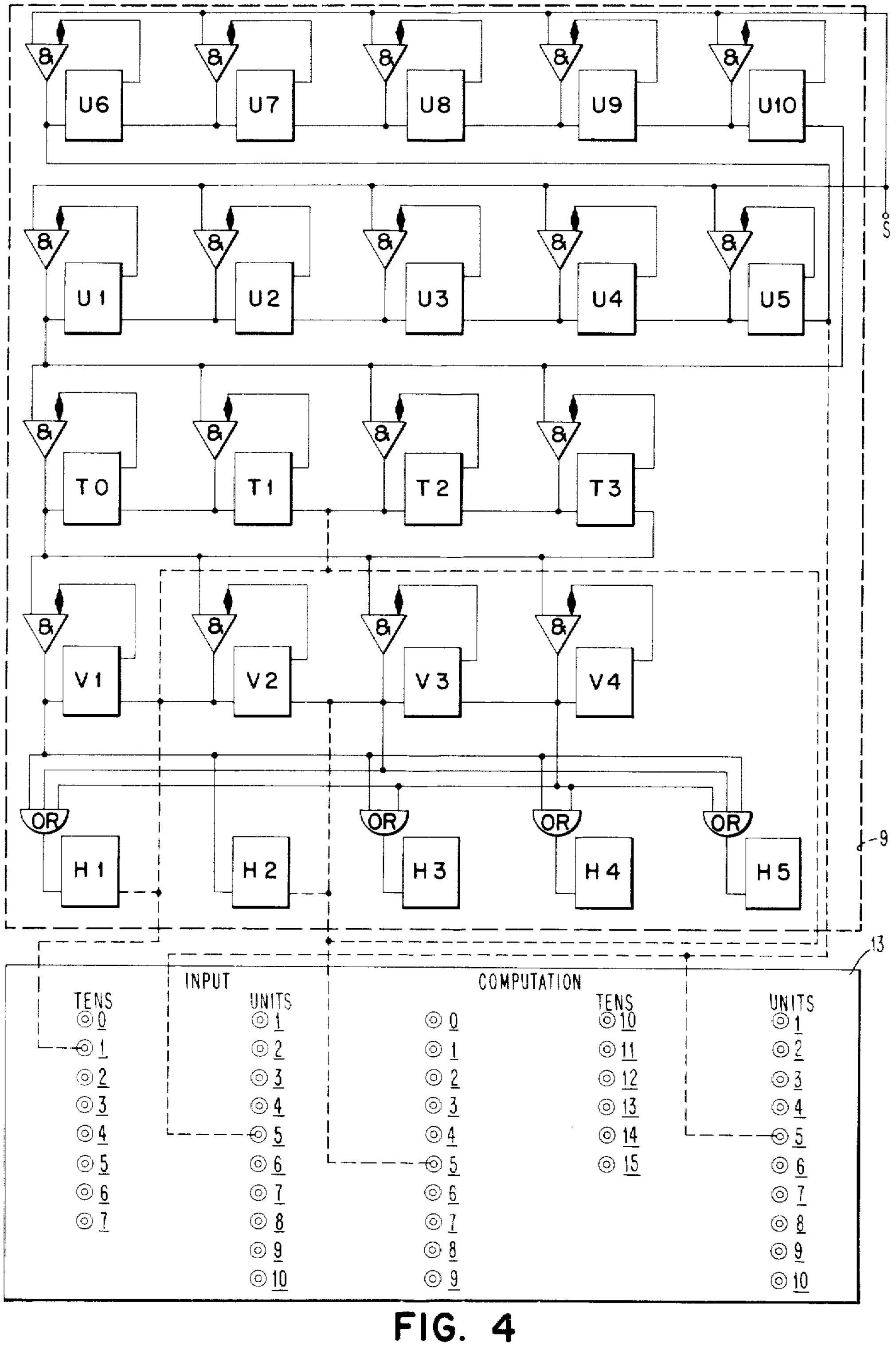
FIG. 4 represents an auxiliary ring and the portion of the plugboard provided for control of that ring.

FIG. 4 represents the auxiliary ring 9 and "initial" board 13. Ring 9 is composed of a set of 5 triggers H and 4 basic rings V, T, U, respectively composed of 4, 4 and 10 triggers. The five triggers of set H correspond each to one of the generator pairs used for the selection of the groups of memory locations and the four triggers of ring V correspond each to the one of the pairs of generators used for the vertical selection. The four triggers of ring T correspond each to one of the electronic switches allowing to select a row of cores within the group selected by the generators, and the triggers of ring U correspond each to one of the electronic switches allowing to select a column.

The two stable states of each trigger will be called respectively ON and OFF states. In the figure, each trigger has been represented by a rectangle. When the trigger is ON, a signal may be collected in the output circuit represented in the upper right part of the figure. This signal controls, through conventional circuits (unshown), the energization of the generators corresponding to the trigger. The switching ON results in applying a signal to the input circuit represented in the lower right part, and the switching OFF results in applying a signal to the input circuit represented in the lower left part.

The advance of the rings is performed by means of diode gates, i.e. two-input AND circuits, which deliver an output signal under the action of a signal applied to one of the inputs (so-called "quick input") when a signal has been applied for some time to the other input (so-called "slow input"). The operation of such circuits is explained in French Patent No. 1,222,539 filed on December 17, 1958.

In the drawings, such circuits are represented by triangles and the slow input is indicated by a lozenge; a triangle without that sign represents a usual AND circuit and half a circle represents an OR circuit.

The slow input of each diode gate is connected to the ON output of a trigger of the chain. When the subject trigger is ON, the application of a signal to the quick input controls the emission of an output signal which sets the trigger OFF and switches ON the next trigger of the ring. For chain U, these advance signals are signals emitted at each digit time by generator 7, FIG. 1. In FIG. 4, this generator has not been represented but only the circuit S through which these signals are applied to ring 9. For ring T, the advance signal is the signal setting trigger $U_1$ OFF, and for ring V, it is the signal turning OFF trigger $T_0$.

It may be seen in FIG. 4, that, from the moment when a trigger of each ring has been switched ON, (1) Ring U advances by one trigger each digit time, the order of the ON trigger decreasing by one unit each time, and when $U_1$ is switched OFF, $U_{10}$ is switched ON.

(2) Ring T advances in a similar way every 10 digit times, the signal causing the advance resulting from the coincidence of a signal in circuit S with the signal supplied by trigger $U_1$ when it is ON.

(3) Ring V may advance by one trigger every 40 digit times, under the action of a signal resulting from the coincidence of the advance signal of chain T with a signal supplied by the ON trigger $T_0$. But trigger $V_1$, when switched OFF, does not cause $V_4$ to be switched ON (in other words, ring V is an open ring, contrary to rings U and T which are closed rings).

Arrangement H is not a ring, for the switching OFF of a trigger does not result in switching ON another trigger. The switching of a trigger OFF is controlled by the same signal as the switching OFF of some triggers, in accordance with the rules resulting from the logical division of the memory into zones. In the case of the device represented, it is seen that:

(1) The switching of $H_1$ or $H_5$ off is controlled at the same time as the passage of $V_1$, $V_3$ or $V_4$ OFF.

(2) The passage of $H_3$ or $H_4$ OFF is controlled at the same time as the switching of $V_1$ or $V_4$ OFF.

(3) The switching of $H_2$ OFF is controlled at the same time as the switching of $V_1$ OFF.

Moreover, when a trigger H is OFF, it supplies a signal on one of its outputs. The combination of the signals supplied by the triggers H when they are all OFF with a signal timing supplied by generator 7 at each digit time controls the resetting of all the triggers of ring 9. The circuit transmitting these signals have not been represented.

From the dispositions indicated above, ring 9 when it has been brought to the state corresponding to the selection of any memory location, with a group, advances first within that group, through the positions in the decreasing numbering order. When it has reached position number 1, it passes to the position 40 of the group represented immediately on the left in FIG. 3, if that group belongs to the same area; in the opposite case, all the triggers are reset.

The ring may be placed in its initial scanning position either by signals automatically transmitted by the permanent circuits of the machine when some conditions are realized, or by signals transmitted through the plugboards. These signals are transmitted from board 12 to board 13 by movable connections and are brought from the hubs of board 13 to the triggers of ring 9 by permanent circuits.

The automatic setting by permanent circuits of the machine is no part of the invention and will not be described.

The selection of the initial scanning position by means of plugboard 13 may be performed by a hub or by a combination of several hubs.

In the device represented, this selection is performed by means of two hubs: a "tens" hub which selects simultaneously a trigger H, a trigger V and a trigger T, and a "unit" hub which selects a trigger U. To each of the memories of unit 1 wherein it is possible to extract information in the course of a non-automatic addressing operation there corresponds a group of tens hubs and a group of "unit" hubs. In the fig., the hubs corresponding to the input memory and to the computation memory have been represented. The positions of the input area are numbered from one to 80, the locations 1 to 40 make group $H_1$–$V_1$ and locations 41 to 80 make groups $H_1$–$V_2$; a similar numbering system (from 1 to 160) is adopted for the locations of the computation area. In the fig., there have been represented only the connections for setting ring 9 in the following cases, illustratively selected:

(1) Scanning starting in position 15 of the input memory (i.e. triggers $H_1$, $V_1$, $T_1$, $U_5$, are turned ON from "tens 1" hub and "unit 5" hub of that memory).

(2) Scanning starting in position 55 of the computation memory (i.e. turning ON of triggers $H_2$, $V_2$, $T_1$, $U_5$, from the "tens 5" and "unit 5" hubs of that memory.

These connections are represented in dotted lines, for a clearer drawing. The circuits from the tens hubs include semi-conductors (unshown) provided to prevent the application of signals to unselected triggers. Besides the ring positioning signals, the hubs of board 13 transmit a signal which, when coinciding with a timing signal supplied by generator 7, controls the resetting of all the triggers. This timing signal is emitted at each digit time and is before that which is transmitted by circuit S and which controls the advance or setting of the ring. The circuit transmitting the above mentioned resetting signals have not been represented.

Figure 5A:
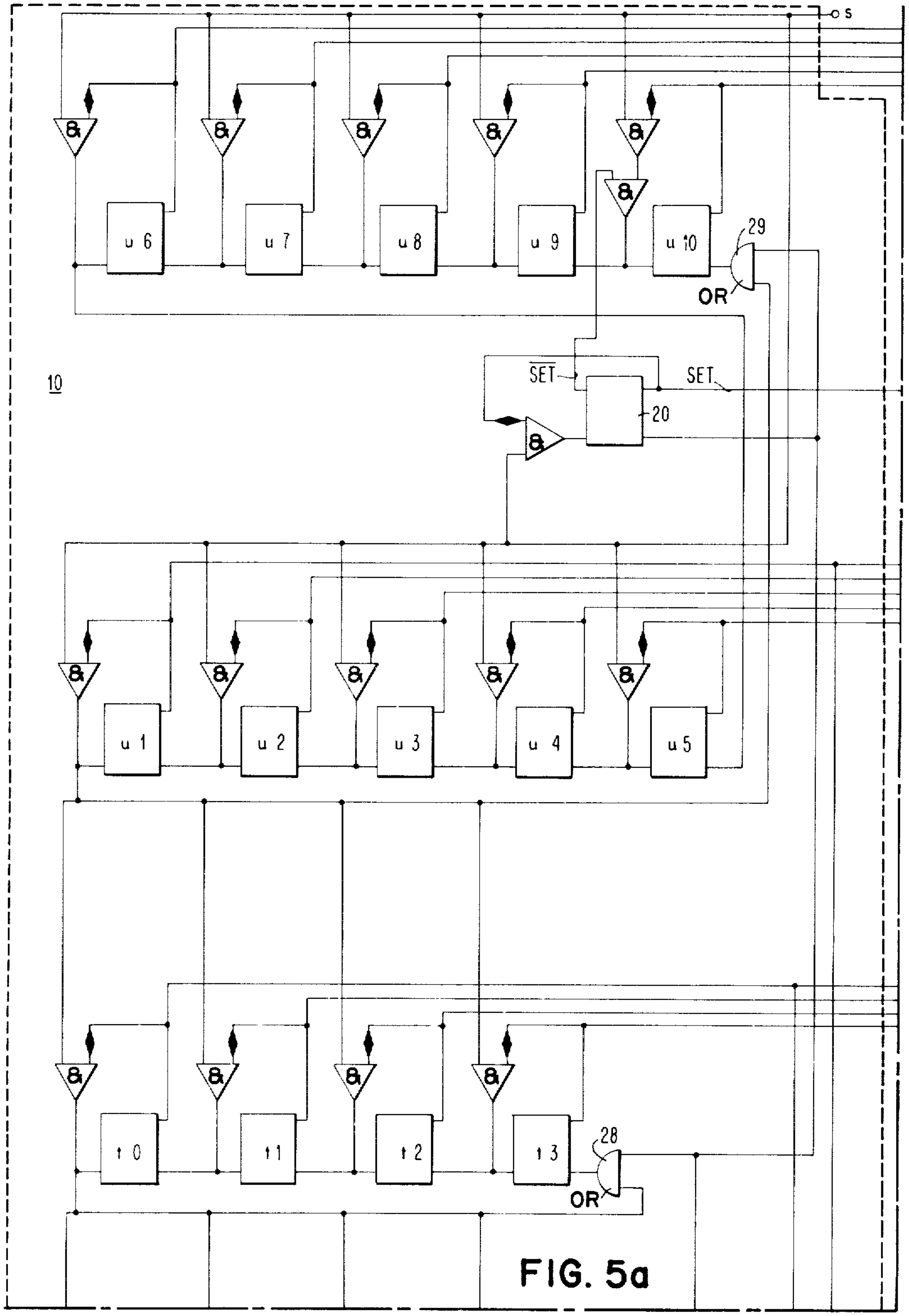
Figure 5B:
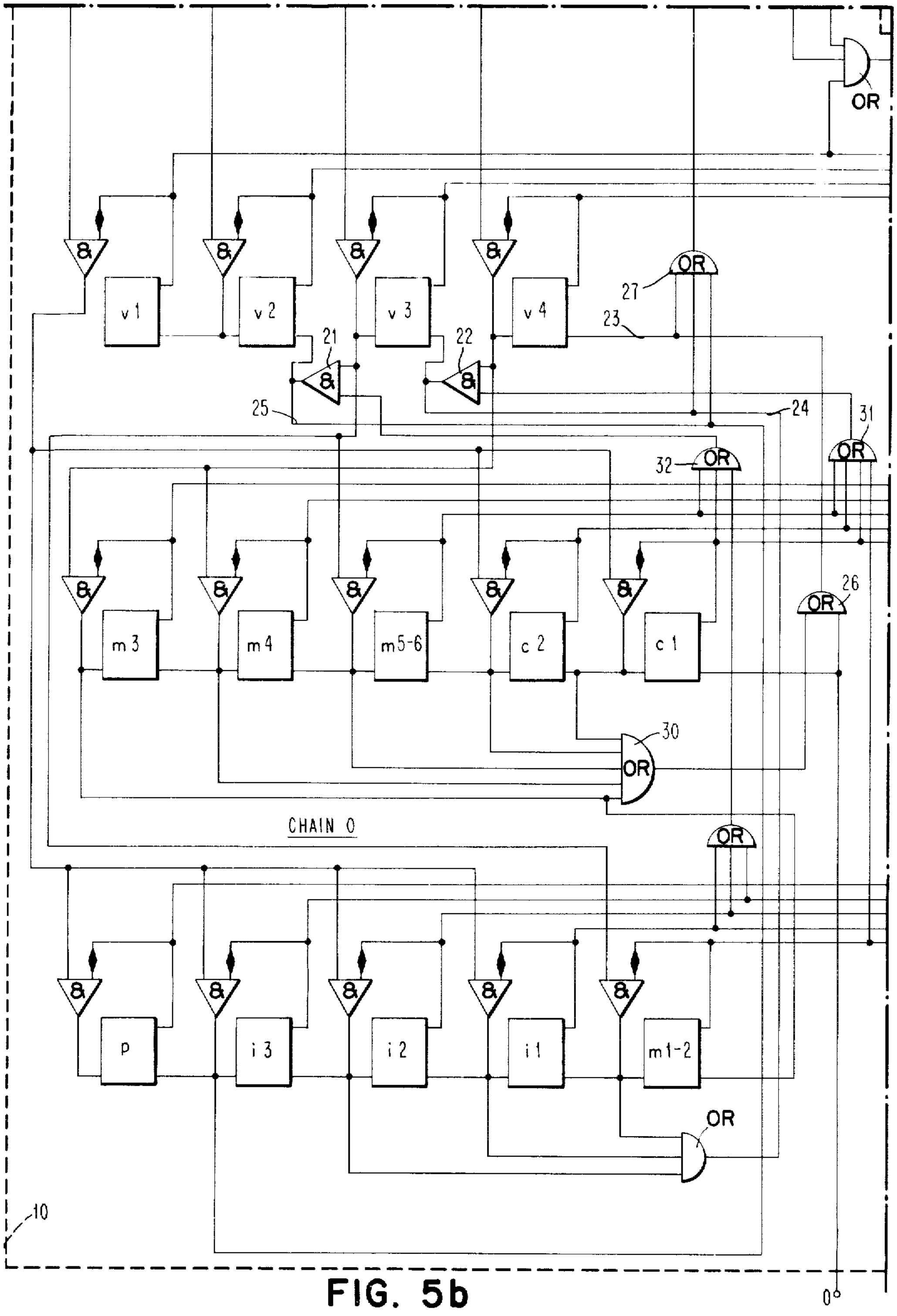
Figure 5C:
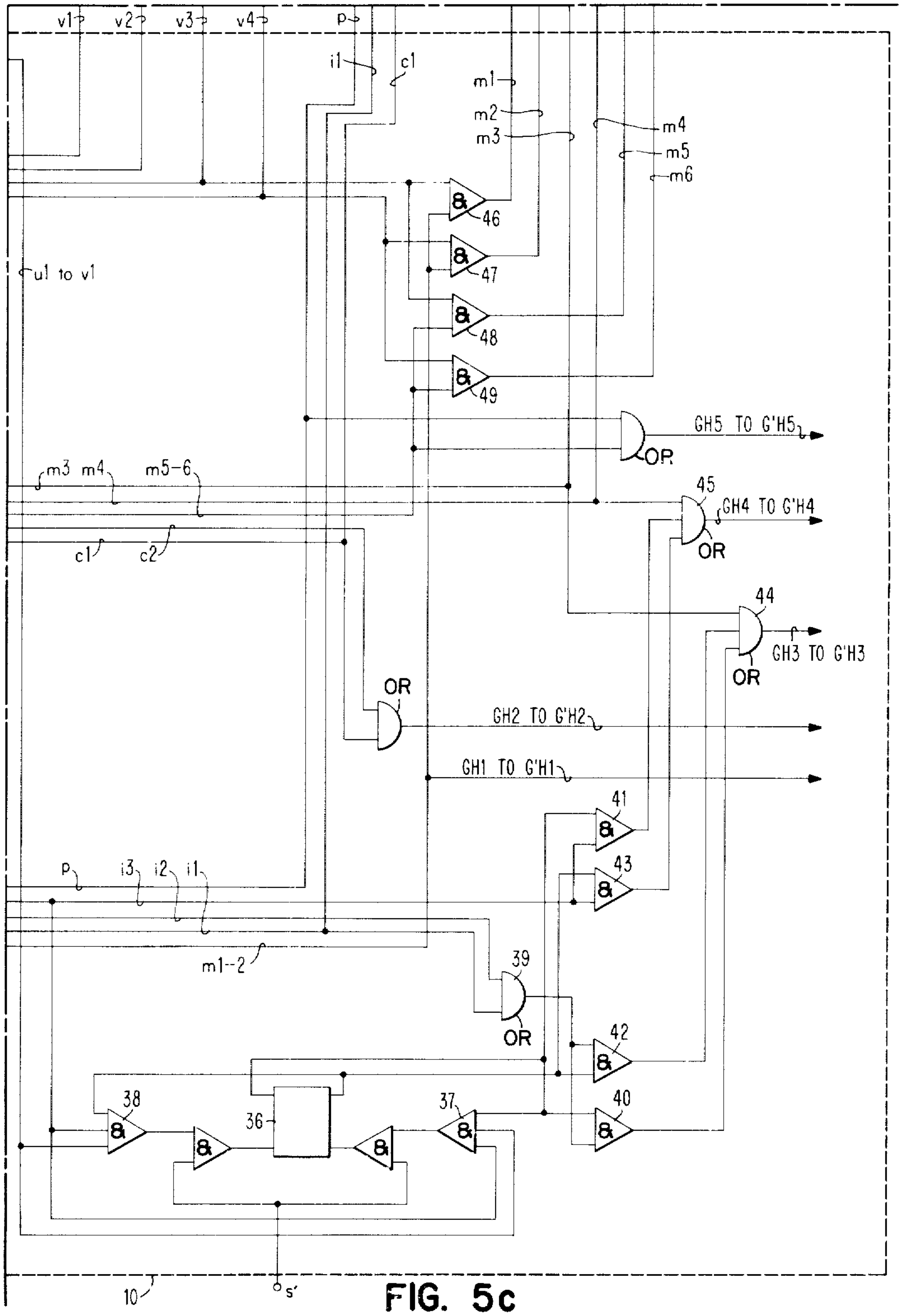
Figure 5D:
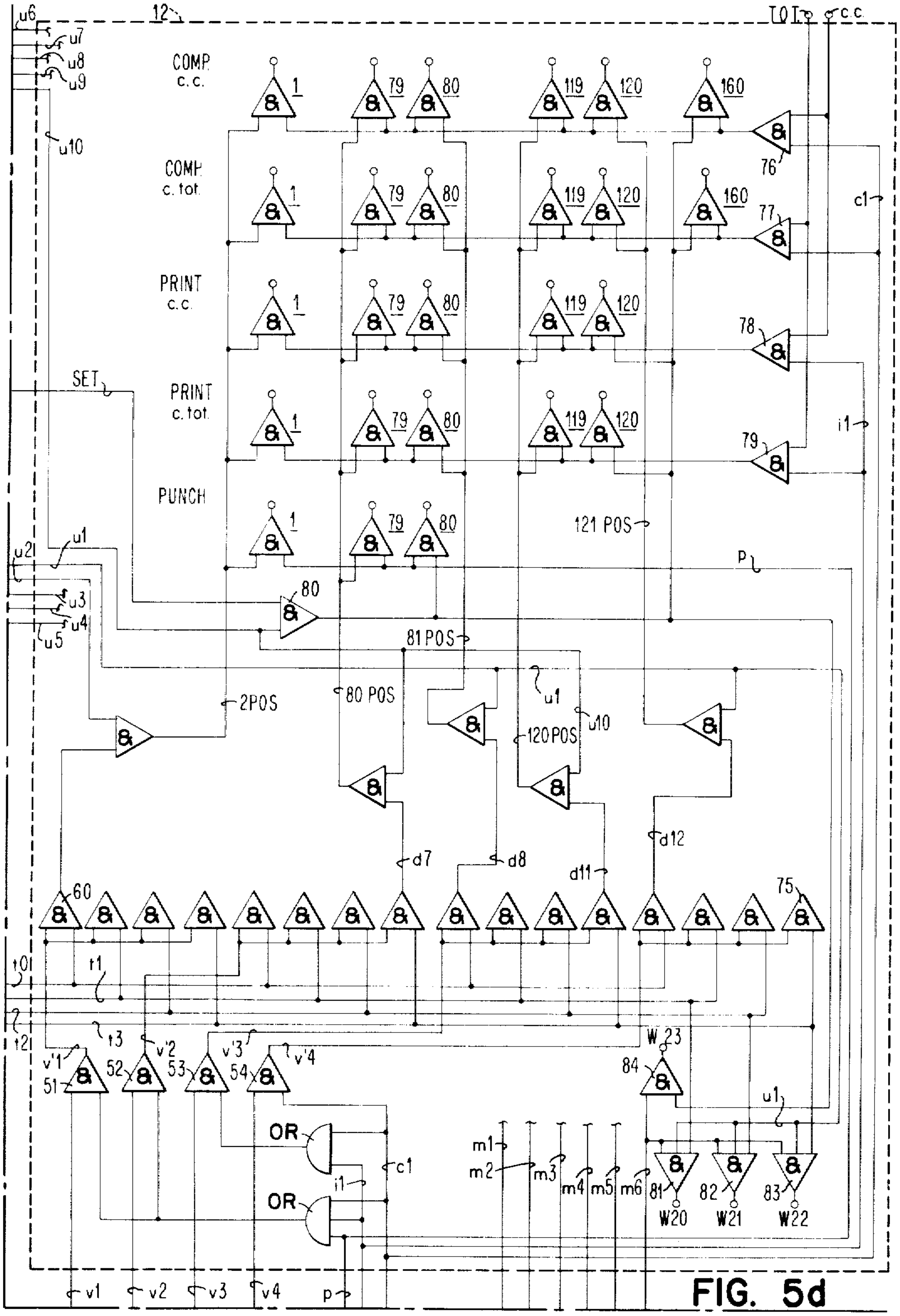

FIGS. 5*a* to 5*d*, arranged as indicated in FIG. 6, represent the main chain 10 (FIGS. 5*a*, 5*b*, 5*c*), and the initial board 12, FIG. 5*d*.

The main chain 10 is formed of four basic chains (FIGS. 5*a* and 5*b*). The triggers of chain 0 (FIG. 5*b*) correspond each to a pair of generators used for the horizontal selection of memory location groups; but several triggers may correspond to the same pair of generators, which permits a re-scan, wholly or partly, of a series of groups already scanned in the course of the preceding step. The triggers of chain $v$ (FIG. 5*b*) correspond each to one of the pairs of generators used for vertical selection. The triggers of chains $t$ and $u$ (FIG. 5*a*) respectively corresponding to the electronic row and column switches to select a location within the group selected by the generators.

Chains $u$ and $t$ are similar to the chains U and T which are part of initial ring 9 (FIG. 4), however, the advance from location $u_{10}$ to location $U_9$ may be prevented by a trigger 20 being turned ON for determining the scanning start location, the function of which will be explained later. The advance signals, which come from generator 7, have the same functions as signals S in the advance of the "initial" or starting ring. They are produced, as signals S, in the proportion of one signal per digit time. Ring $v$ is similar to ring V, but the advance from location $v_4$ to location $v_3$ and the advance from position $v_3$ to position $v_2$ are not caused automatically by the signal resetting trigger $t_0$. These advances are further subjected to additional requirements concerning the condition of chain 0. These conditions which will be indicated later on, are translated by signals from one of the inputs of the AND circuits 21 and 22. Moreover, the ring advance pulses may, in some cases, turn directly ON one of triggers $V_4$, $V_3$, or $V_2$, through circuits 23, 24, or 25.

The triggers of ring 0 define a horizontal row of memory groups and a step in the course of which this row or part of this row is scanned. In the illustrative example, ring 0 comprises 10 triggers corresponding to the ten following steps:

$c_1$—computation memory scanning
$c_2$—new memory scanning
$m_{5-6}$—scanning of memories $M_6$ and $M_5$
$m_4$—scanning of memory $M_4$
$m_3$—scanning of memory $M_3$
$m_{1-2}$—scanning of memories $M_2$ and $M_1$
$i_1$—scanning of one of the print preparation zones
$i_2$—new scanning of that area
$i_3$—scanning of the other print preparation area
$p$—scanning of the perforation preparation area.

The ring is set in position $c_1$ by a signal from the circuits of the machine embodying the program device herein described; this signal is produced by means unshown, after the readout of the information by input circuits 2 and the transmission of this information in the input memory. This signal also puts ON triggers $v_4$, $t_0$, and $u_1$ through OR circuits 26 (FIG.5*b*), 27 (FIG. 5*b*), 28 (FIG. 5*a*) and 29 (FIG. 5*a*). Besides, that signal puts ON the trigger setting the scanning start addresses 20 (FIG. 5*a*), so that the signal *s* which immediately follows signal 0 does not make ring 10 advance but that signal resets trigger 20, so that, from the following signal *s*, the ring advances normally.

It is easily seen from the circuits of the fig., that the end of the scanning causes trigger $c_1$ to be reset and trigger $c_2$ to be switched ON, as well as a new scanning of the computation memory controlled by a signal transmitted by OR circuit 30, the beginning of that scanning being delayed by one digit time by the setting trigger. The end of the scanning controls the resetting of trigger $c_2$ and the turning ON of trigger $m_{5-6}$ and so on, which results in the execution of the scanning sequence indicated above, the beginning of each scanning being delayed by one digit time by trigger 20. The selection of the trigger of chain *v* which must be turned ON at the beginning of each scanning is controlled by a signal transmitted by one of the circuits 23, 24, or 25 and the advance from one memory location group to another (i.e. the advance of chain *v*) depends upon the scanned memory, is controlled by a signal transmitted by one of the OR circuits 31 or 32.

The first scanning of the computation memory is used to perform the operations defined by the plugboards and to record the results, the second scanning may be used to transform in clear the results obtained under the complementary form.

The successive scannings of the print preparation memories allow to perform the following operations:

(1) Setting of the characters to be printed (2) Insertion of new characters or signs or erasure of zeros (3) Computation of the movements to be controlled to the printing organs; this computation is to be performed in some printing devices wherein the organs are not brought back to their reset position after print.

To perform these computations, it is necessary to know the actual position of the organs i.e. the characters printed in the course of the preceding cycle of the machine, therefore it is necessary to preserve the information representing these characters during the cycle following that during which their printing has been ordered; it is therefore necessary to provide two print preparation memories, and, to avoid the transfer from one zone of the memory to another, the function of these two memories is inverted between two successive cycles; this inversion is obtained by means of trigger 36 (FIG. 5*c*) which is switched at the end of the step $i_3$ of each cycle, under the action of a signal transmitted by one of the AND circuits 37 or 38 (combining the signal supplied by one of the outputs of the trigger, the signal $u_3$ and a signal resulting from the coincidence of signals $u_1$, $t_0$, and $v_1$) and of a timing signals from generator 7. When trigger 36 is OFF, the signals supplied by triggers $i_1$ and $i_2$ are transmitted to the OR circuit 44 by OR circuit 39 and AND circuit 40, whereas the signal supplied by trigger $i_3$ is transmitted to OR circuit 45 by AND circuit 41. When trigger 36 is ON, the signals supplied by triggers $i_1$ and $i_2$ are transmitted to OR circuit 35 by AND circuit 42, and the signal supplied by trigger $i_3$ is transmitted to OR circuit 44 by AND circuit 43.

The outputs of the triggers of ring 0 and of trigger 36 are used to control read pulse generators $GH_1$ to $GH_5$ and writing pulse generators $G'H_1$ to $G'H_5$. It is seen in FIG. 5*c* that (1) Generators $GH_1$ and $G'H_1$ are selected by $m_{1-2}$ (2) Generators $GH_2$ and $G'H_2$ are selected by $c_1$ or $c_2$ (3) Generators $GH_5$ and $G'H_5$ are selected by *p* or $m_{5-6}$ (4) Generators $GH_3$ and $G'H_3$ are selected by $m_3$ or by $i_1$ or $i_2$ (if 36 is ON) or by $i_3$ (if 36 is OFF)

(5) Generators $G_4$ and $G'_4$ are selected by $m_4$ or by $i_1$ or $i_2$ (if 36 is ON) or by $i_2$ (if 36 OFF).

The connections between the outputs of the triggers of the ring (or those of the logical circuits which join the outputs) and the pulse generators have not been represented, as these connections may be circuits of known types.

In the upper part of FIG. 5*c*, there have been represented AND circuits 46 and 47 which join respectively the signals supplied by triggers $v_3$ and $v_4$ with the signal supplied by trigger $m_{1-2'}$ to provide signals $m_1$ and $m_2$ which exist respectively while storages $M_1$ and $M_2$ are scanned; similarly, AND circuits 48 and 49 supply signals $m_5$ and $m_6$ existing respectively during the scanning of storages $M_5$ and $M_6$.

FIG. 5*d* represents plugboard 12. This plugboard receives from main chain 10 the following signals:

(1) Column signals $u_1$ to $u_{10}$ (2) Row signals $t_0$ to $t_3$ (3) Vertical group definition signals $v_1$ to $v_4$ (4) Zone signals $c_1$, $i_1$, *p* and $m_1$ to $m_6$.

Besides, board 12 receives signals defining the type of program that the machine is to perform. That type of program characterizes the cycle, and may vary from one cycle to the next. Thus, if the machine is fed with punched cards, it may be necessary to define two types of programs: a card cycle program performed during a cycle starting by the read-out of a card, comprising operations using the data read from that card, and a total cycle program, performed in the course of a cycle which follows the passage of a group of cards, and comprising operations wherein the data are simply made of information obtained during the preceding cycles. The cycle type memory may be made of the relays controlled by signals from the read circuits. In the fig., this memory has not been represented; there have only been represented the circuits transmitting the cycle type indications; these circuits are designated respectively by reference CC (card cycle) and TOT (total cycle).

AND circuits 51 to 54 supply respectively: signal $v'_1$ resulting from the coincidence of signal $v_1$ with one of the signals $c_1$, $i_1$ or signal $v'_2$ resulting from a similar coincidence ($v_2$ with $c_1$; $i_1$ or *p*), signal $v'_3$ resulting from the coincidence of $v_3$ with $c_1$ or $i_1$; and signal $v'_4$ resulting from the coincidence of $v_4$ with $C_1$. These four signals are combined with signals $t_0$ to $t_3$ and the 16 AND circuits 60 to 75 so as to form 16 tens signal $d_0$ to $d_{15}$; these signals are combined wtih signals $u_1$ to $u_{10}$ in 160 AND circuits, so as to form 160 memory location signals. It is to be noted that the first 80 signals may represent, according to the condition of ring 0, addresses of the computation memory, of a print preparation memory or of the perforation preparation memory; the 40 following signals may represent positions of the computation memory or of a print preparation memory, and the last 40 can represent only addresses of the computation memory.

In the figure, there have been represented only the circuits corresponding to the second, the 80th, the 81st, the 120th, the 121st, and the 160th location.

These signals are combined with other signals depending both upon the scanned memory and the cycle program type. These signals are as follows:

(1) A card cycle computation step signal supplied by AND circuit 76.

(2) A total cycle computation step signal supplied by AND circuit 77.

(3) A card cycle printing preparation step, supplied by AND circuit 78.

(4) A total cycle printing preparation step signal supplied by AND circuit 79.

(5) A perforation preparation step signal supplied by circuit $p$.

The combination of these signals with the location signals is realized by means of five groups of AND circuits; the output of each of these circuits is connected to a hub. Thus there is provided two groups of 160 hubs, two groups of 120 hubs and one group of eighty hubs. In the figure, the rows of hubs in their groups have been indicated by underlined numbers, to avoid confusions. In the course of phases $c_1$, $i_1$ and $p$ of each cycle, the hubs of the group corresponding to the scanned memory or to the type of program supply successively, each during a digit time, a signal characterizing the memory location wherein are performed read-out and read-in during the "final" part of that time.

According to the invention, this signal may be transmitted to the board 13 to position "initial" ring 9. This positionment must be made before the beginning of the first digit time of the controlled operation; it must therefore be transmitted while "final" chain 10 is in the position preceding that which corresponds to the beginning of the operation (i.e. to the positoin with a number higher by one unit than the operation start or initial address. The hubs being referenced with the number of the operation start address, the hub corresponding to second storage address will be referenced 1, that corresponding to the third address 2, and so on. The hub with the higher number in each memory (160, 120, or 80, depending the cases) receives a signal during the digit preceding the beginning of the scanning of that memory, i.e. while scanning start trigger 20 (FIG. 5*a*) is ON. This signal is supplied by AND circuit 80 (FIG. 5*d*), which combines the setting signal supplied by the output of that trigger, and signal $u_{10}$ (the insertion of the latter signal is not compulsory, but increases the safety, for it ensures that the chain $u$ has actually been positioned).

Besides the above mentioned hubs, board 12 comprises the hubs corresponding to steps $m_{5-6}$ to $m_{1-2'}$, in the course of which step, memories $M_6$ to $M_1$ are scanned. But the board comprises but one hub per 10-location group each group being defined by one of signals $m_1$ to $m_6$ and one of signals $t_0$ to $t_3$; this hub supplies a signal at the digit time preceding that during which the "final" ring scans the first address of the group. These hubs therefore are 24 in number; the figure shows the last four only, referenced $W_{20}$ to $W_{23}$ and corresponding to memory $M_6$.

Signals $W_{20}$, $W_{21}$ and $W_{22}$ derive respectively from AND circuits 81, 82 and 83 which combine signal $m_6$, signal $u_1$ and one of signals $t_1$; $t_2$ or $t_3$; signal $W_{23}$ comes from AND circuit 84 which combines signal $m_6$ with the set signal mentioned above.

In the drawing, there has been represented a single hub for each signal, but it is obvious that these hubs may be multiplied, and that it is possible to associate with each of the hubs represented expansion hubs connected to the signal originating hub by a power amplifier.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a data processing machine including a storage device for storing a plurality of characters at selectable address locations, a first storage address register containing a number which is the address of a character to be selected, a second storage address register containing a number which is the address of a character to be selected, a first time period and a second time period in which a character stored at an address specified by said first address register and said second address register may be read out from said storage and recirculated and rewritten in its original address location, a first recirculation register for receiving the character in the address specified by said first storage address register during said first time period, a second recirculation register for receiving the character in the address specified by said second storage register during said second time period means for connecting the recirculation registers to said storage, means operable to selectively gate the character stored in said first or second recirculation register into the location in storage specified by the address in said second address register during said second time period, and means connecting said first address register to said second address register for setting said second address register to a predetermined address in response to a predetermined address contained in said first address register.

2. The apparatus of claim 1 further including an operation register for selecting an operation to be performed, and means connecting said second address register to said operation register to selectively set an operation therein in response to a predetermined address in said second register.

3. The apparatus of claim 1 wherein each said address register includes a ring circuit successively advanced during each cycle to indicate the next incremental number.

4. The apparatus of claim 3 wherein said means for connecting said address registers together comprises a selective wiring circuit including a plugboard.

References Cited by the Examiner

UNITED STATES PATENTS

| | | | |
|---|---|---|---|
| 2,872,110 | 2/1959 | Snyder et al. | 235—157 |
| 2,914,248 | 11/1959 | Ross et al. | 235—157 |
| 2,993,437 | 7/1961 | Demer et al. | 101—93 |

MALCOLM A. MORRISON, *Primary Examiner.*